US010506800B2

(12) United States Patent
Hansen

(10) Patent No.: US 10,506,800 B2
(45) Date of Patent: Dec. 17, 2019

(54) DEVICE AND A METHOD FOR REDUCING THE NUMBER OF EXTERIOR PARASITES ON FISH

(71) Applicant: SFI SYSTEM IVS, Tilst (DK)

(72) Inventor: Eyobjorn Hansen, Faroe Islands (DK)

(73) Assignee: SFI Systems IVS, Tilst (DK)

( * ) Notice: Subject to any disclaimer, the term of this patent is extended or adjusted under 35 U.S.C. 154(b) by 7 days.

(21) Appl. No.: 15/577,327

(22) PCT Filed: May 27, 2016

(86) PCT No.: PCT/EP2016/062036
§ 371 (c)(1),
(2) Date: Nov. 27, 2017

(87) PCT Pub. No.: WO2016/189146
PCT Pub. Date: Dec. 1, 2016

(65) Prior Publication Data
US 2018/0153142 A1 Jun. 7, 2018

(30) Foreign Application Priority Data
May 28, 2015 (DK) .................. 2015 70327

(51) Int. Cl.
*A01K 61/00* (2017.01)
*A01K 63/04* (2006.01)
*A01K 61/13* (2017.01)

(52) U.S. Cl.
CPC ............ *A01K 61/13* (2017.01); *A01K 63/045* (2013.01); *Y02A 40/814* (2018.01)

(58) Field of Classification Search
CPC ...... A01K 61/13; A01K 61/00; A01K 63/045; A01K 61/10; A01K 61/17; A01K 61/60; A01K 61/90; A01K 61/95; Y02A 40/814; Y02A 40/826
See application file for complete search history.

(56) References Cited

U.S. PATENT DOCUMENTS

| 5,560,318 | A | * | 10/1996 | Yoshida | ............... A01K 63/003 |
| | | | | | 119/248 |
| 6,520,752 | B1 | * | 2/2003 | Hosford | ............... A01K 63/045 |
| | | | | | 417/313 |
| 2017/0172114 | A1 | * | 6/2017 | Halse | ..................... A01K 61/00 |

FOREIGN PATENT DOCUMENTS

| CA | 2858878 A1 | * | 2/2015 | ............. A01K 61/13 |
| EP | 3114926 A1 | * | 1/2017 | ............... A61D 7/00 |
| JP | 5225561 B2 | | 7/2013 | |
| NO | 301440 B1 | | 10/1997 | |
| NO | 304171 B1 | | 11/1998 | |
| NO | 20093398 A1 | | 5/2011 | |
| WO | 9824304 A1 | | 6/1998 | |
| WO | 2014184766 A1 | | 11/2014 | |
| WO | 2015043603 A1 | | 4/2015 | |

* cited by examiner

Primary Examiner — Kathleen I Alker
(74) Attorney, Agent, or Firm — Fox Rothschild LLP; Carol E. Thorstad-Forsyth

(57) ABSTRACT

A device for reducing the number of exterior parasites on fish, comprising a hollow cylindrical filter member (3) having an inlet and an outlet, the circumference of the inlet and/or outlet being provided with a nozzle (1a, 1b), wherein the nozzle comprises a substantially annular slit along the circumference of the inlet and/or outlet for ejecting a fluid towards the interior of the cylindrical filter (3).

18 Claims, 4 Drawing Sheets

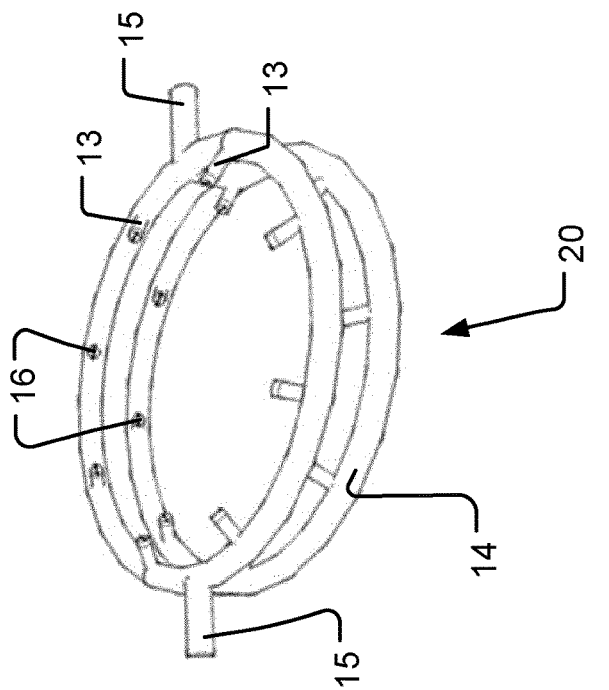
Fig. 3
Fig. 3b
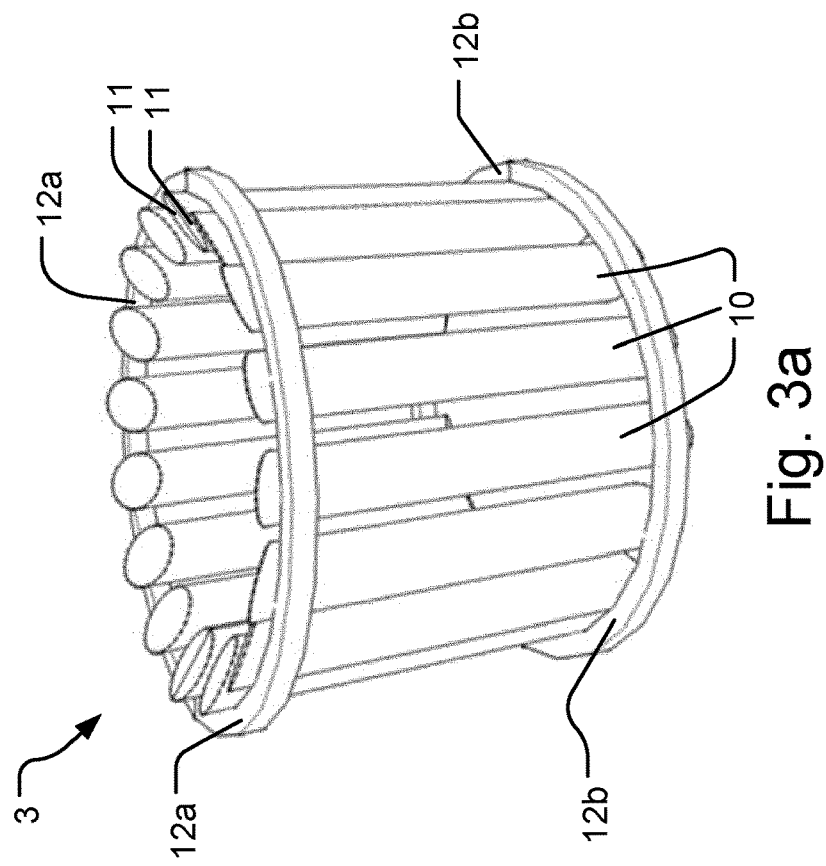
Fig. 3a

DEVICE AND A METHOD FOR REDUCING THE NUMBER OF EXTERIOR PARASITES ON FISH

RELATED APPLICATION DATA

The present application is the U.S. National Phase of International Patent Application No. PCT/EP2016/062036, filed on May 27, 2016 and entitled "A DEVICE AND A METHOD FOR REDUCING THE NUMBER OF EXTERIOR PARASITES ON FISH," which claims priority to Danish Patent Application No. PA 2015 70327, filed on May 28, 2015 and entitled "A DEVICE AND A METHOD FOR REDUCING THE NUMBER OF EXTERIOR PARASITES ON FISH," the contents of which are incorporated herein by reference in their entireties.

INTRODUCTION

The present invention relates to a device and a method for reducing the number of exterior parasites on fish.

BACKGROUND ART

Sea lice and other ectoparasites feed on their host causing fish to lose skin and scales, which can cause deadly infestations to both farmed and wild fish. The problems often arise from farms of fish due to the higher density of fish found there. Without means of treating the farmed fish, the farmed fish may infest the wild fish population.

Commonly used treatments cover both chemical treatment and mechanical treatment. A suitable example of a mechanical treatment is found in WO 98/24304, which discloses a method and a device for removing exterior parasites from salmon in fish farms. The method is described as mechanical stripping, wherein the fish is led through a water current and subjected to water jets from a number of nozzles. The device is described as comprising four or more nozzles, which are all connected to a water pump. When fish is led past the nozzles, they are subjected to strong water jets ejected from the nozzles.

Another example is found in WO 2015/043603, wherein a system and a method are described. The system is described to suck up water and fish using a suction tube connected with a pump system. The fish is thereby transported upwards from the first volume and onwards to another volume via the suction tube. On the upwards part of the transportation path, that is where the fish is moving upwards, the suction tube is provided with a number of nozzles, which ejects water jets towards the fish in order to spray off parasites. The discrete nozzles treat the fish in a point-wise fashion in which some part of the circumference of the fish is left untreated. The untreated or under-treated part of the fish increases the possibility of the parasites to remain on the fish skin after the treatment.

SUMMARY OF THE INVENTION

On this background one object of the invention is to provide an improved device and a method for reducing the number of exterior parasites on fish. It is also an object of the present invention to provide a device which is versatile and cost efficient in production and in operation.

According to the present invention these objects are met by means of a device for reducing the number of exterior parasites on fish, comprising a hollow cylindrical filter member having an inlet and an outlet, the circumference of the inlet and/or outlet being provided with a nozzle, wherein the nozzle comprises a substantially annular slit along the circumference of the inlet and/or outlet for ejecting a fluid towards the interior of the cylindrical filter.

The device according to the present invention allows for a homogenous treatment of fish in its entire circumference. Furthermore, by utilizing an annular nozzle, provided at the inlet and/or outlet, the technical construction is simplified. The technical simplicity of the construction of the device lowers the production cost and provides a device, which requires limited maintenance. The device thus provides a circumferential fluid stream around the entire circumference of a passing fish, thereby the fluid stream is impinging on the entire circumference of the fish.

After the fluid has hit the fish, it will contain the parasites removed from the fish. By directing the circumferential fluid stream towards the interior of the hollow cylindrical filter, the parasite containing fluid will be directed towards the filter member. Guiding the parasite containing fluid towards the filter facilitates easy filtration of the fluid and the therein included parasites. This in turn separates the parasites from the proximity of the fish, preventing reattachment of the parasites to the fish. Thus, the parasites are effectively separated from the fish during the treatment.

The ejection fluid may be a liquid or a gas. Most common is the use of water and/or air. The source providing the ejection fluid, may be a centrifugal pump or similar pumps capable of delivering the pressure of the ejection fluid necessary for providing sufficient velocity of the ejection fluid. Also a compressor of suitable performance may provide the necessary pressure and velocity of the ejection fluid, if the ejection fluid is a compressible fluid such as gas. Typically, if the fluid is a gas, such as air, the gas is pressurized prior to exiting the nozzle slit to a pressure of at least 1.0 MPa to ensure a sufficient velocity of the gas when it exits the slit. Suitably, the pressurized gas has a pressure of at least 1.2 MPa, such as at least 1.5 MPa. Generally, an improved removal of parasites is not obtained for a pressure above 10 MPa. Preferred pressures of the inlet gas to the nozzle is not above 8.0 MPa for an economical process, and is preferably not above 6.0 MPa.

The device according to the present invention has no moving parts when in use, which limits the wear on each component of the device. By reducing wear, the lifespan of the device is extended.

When used herein, the term "substantially fluid tight connection" is to be understood as a connection through which fluids applied to the device, such as the ejector fluid, is not able to pass under general conditions. Openings through which fluid can pass, may however be provided in the "substantially fluid tight connection" in cases where this is intended and/or provides an intended functionality.

The terms "blade-effect" and "ejector blade" is to be understood as a thin stream of substantially laminar flow ejected from a nozzle slit, to provide a scraping effect on the surface of a passing subject. In relation to the present invention the surface of the fish is scraped by the ejector blade to remove exterior parasites. By the term laminar is understood a movement of the fluid in which the individual fluid components are essentially oriented in the same direction. The effect resembles that of a squeegee on a window. A known commercially available product using this "blade-effect" is the Dyson Airblade™.

The term "cylinder" or "cylindrical" includes any shape that can be produced by a generatrix. Generally, the generatrix is parallel to the axis of the device. Specific cross-sectional shapes of the cylinder include a circular or polygonal shape. Examples of polygonal shapes include a trigonal, tetragonal, pentagonal, hexagonal, heptagonal, octagonal, nonagonal, decagonal, etc.

The device according to the present invention can be made from various different materials, including different kinds of plastic and/or metals. In a certain aspect of the invention the nozzle parts in direct contact with the gas is of a durable material like metal or ceramic. A suitable material is aluminum, such as anodized aluminum, or stainless steel. The other part of the device including the filter and the drain may be produced in a material not easily corroded by saline water. Suitable materials include polymers, such as polyethylene (PE), polyvinylchloride (PVC), polycarbonate, polytetrafluoroethylene (PTFE), polystyrene (PS), polyethylene terephthalate (PET), poly(methyl methacrylate) (PMMA), etc.

In an embodiment of the device according to the present invention, the nozzle is formed by a number of discrete nozzle members, each having a slit, wherein the discrete nozzle members are provided along the circumference of the inlet and/or outlet. By using a number of discrete nozzle members with slits, a more robust structure of the nozzle can be obtained. By providing the nozzle members around the circumference of the inlet and/or outlet, a substantially annular slit is created resembling the effect of a continuous slit of the annular nozzle. The substantially annular slit provides a homogenous treatment of fish. By providing the nozzle members in an angle relative to the plan of the circumference of the nozzle, a "cone-style" blade is produced. The lower the number of nozzle members in each nozzle, the wider the slit of each nozzle member may be. In a further development of the embodiment above, the number of discrete nozzle members is 4 or more, such as 5, 6, 7, 8, 9, 10, 11, 12, 13, 14, 15, 16, 17, 18, 19, 20 or more. The length of the slit in each nozzle member, or the spread created by the spray of each nozzle member, may have influence on the number of nozzle members. It is preferred that the "ejector-blade" effect created by the nozzle, regardless of the number of discrete nozzles used, provides sufficient coverage of the area that the fish passes, so that substantially the entire circumference of the fish is treated by the "ejector-blade" effect.

In an embodiment of the device according to the present invention, the device further comprises a housing encasing the hollow cylindrical filter member and connected to the inlet and outlet, providing a substantially fluid tight connection. Such housing provides an outer barrier towards the surroundings, which helps to contain and possibly control the parasite containing fluid, thereby preventing reentry of the parasites into the habitat or surroundings. The housing can be adapted to allow connection with multiple additional components, e.g. a conduit and/or a drain.

In an embodiment of the device according to the present invention, the annular slit of the nozzle ejects the fluid towards a first predefined point of the hollow cylindrical filter. Directing the ejected fluid towards a predefined point of the hollow cylindrical filter allow for additional uniform treatment of fish in its entire circumference, even if the size of passing fish varies.

In an embodiment of the device according to the present invention, the device further comprises a second nozzle having a substantially annular slit along the circumference of the inlet or outlet not occupied by the first nozzle, wherein the substantially annular slit of the second nozzle is provided for ejecting a fluid towards a second predefined point of the hollow cylindrical filter. The opposing directions of the ejected fluids provide a more effective treatment due to the fact that parasites potentially withstanding the first part of the treatment will be more vulnerable for the second treatment. Furthermore the geometrical form of the fish may make it difficult to remove parasites from certain parts of the fish with a single fluid ejection. By applying a nozzle with an annular slit, at each of the inlet and outlet, the ejection of fluid in opposing directions further aids the confinement of the ejection fluid within the device, facilitating effective filtration of the fluid from the fish, and ridding the fish from the parasites.

In an embodiment of the device according to the present invention, the first and the second predefined points are provided at different locations of the hollow filter. By aiming the ejected fluids from the two annular slits towards different predefined points, two zones can be produced, which are separated by a third mixing zone, in which the parasites may be guided through the filter openings of the hollow cylindrical filter.

In an embodiment of the device according to the present invention, at least one of said slit is between 0.01 mm and 2 mm. By having a slit opening of between 0.01 mm and 2 mm a "blade-effect" can be achieved, i.e. a thin substantially laminar ejection stream with high velocity is provided, which collides with the surface of the fish and blow away the parasites. This thin "ejector blade" is energy and resource efficient, as it require little fluid to function. It produces a substantially laminar flow of fluid along the entire slit using the Coanda effect which entrains a large volume of fluid from the surrounding area along with the small amount of fluid from the nozzle slit itself. To provide the desired effect, the slit is preferably above 0.01 mm, such as 0.02 mm, 0.03 mm, 0.04 mm or 0.05 mm. However, it is generally not necessary to use a slit opening above 2.0 mm, such as above 1.0 mm, 0.8 mm, 0.5 mm, 0.2 mm, or 0.1 mm. The gap of the slit opening may be adjustable by suitable means to provide versatility to the impact force of the ejector blade. Applying the same inlet pressure of the fluid will provide a softer "ejector blade" for wider gaps, whereas a thinner opening will provide a harder "ejector blade" effect. The "width" or "gap" of the slit in this relation is to be understood as the measurement of the opening perpendicular to the diameter.

In an embodiment of the device according to the present invention, the device further comprises a draining conduit provided in the housing, said draining conduit having at least one opening arranged to receive the parasites. Addition of a draining conduit to the housing facilitates removal of detached parasites, thereby preventing accumulation of parasites within the device housing. The draining conduit may be an integral part of the housing. Furthermore by draining the parasites in a controlled manner through a draining conduit, reentrance of the parasites into the habitat is avoided. Multiple openings to the draining conduit can be provided, as well as multiple separate draining conduits. Also the draining conduits may comprise one or more filters and/or sorting mechanisms, to further process the filtrate fluid and parasites received from the device.

In an embodiment of the device according to the present invention, the nozzle comprises two or more nozzle elements arranged in two or more levels displaced along the axis of the hollow cylindrical filter member. Arranging two or more nozzle elements in different levels, is especially, but not necessarily exclusively, preferable, when nozzle elements made by a number of discrete nozzle members are used. By arranging nozzle elements in different levels, a nozzle element in one level can complement the treatment of a nozzle element in another level. This provides more security, since a malfunction of one nozzle member in one level, still leaves the nozzle members of another level intact and operable, thus able to compensate for the malfunctioning nozzle member. It is to be understood that a different number of nozzle members can provide similar effects. Arranging the nozzle members in only one level may be sufficient in some cases, and in some cases more than two levels may be more suitable. The shape of each nozzle element may be circular or partly circular, such as half moon shaped. When partly circular nozzle elements are used, they are arranged to complement each other in different levels to ensure a full treatment of the fish. The number of nozzle members in each level need not be the same.

In a further development of the embodiment above, the nozzle members of a nozzle element of at least one level are off-set relative to the nozzle members of a nozzle element at another level. By off-setting one nozzle relative to another, an even better complementation between levels is achieved. In the event of "blind spots" e.g. caused by obstruction of a nozzle member, other nozzle members of other levels will compensate.

In an embodiment of the device according to the present invention, the hollow cylindrical filter member comprises a number of parallel and distanced rods around the circumference. By arranging parallel and distanced rods around the circumference of the filter member, so that they span between the inlet and the outlet, a natural guiding is created inside the filter member. By virtue of the straight rods, a smooth guiding is created for the fish passing through the filter member. The space between the rods provide the filter member with its filtering properties, as the spaces are large enough to let parasite containing water pass, but retain fish. The rods are fixed in each end to a connecter, serving to hold the rods in place. The connectors may also serve as spacers, keeping a substantially constant positioning of the hollow cylindrical filter member within a housing. It is to be understood that the rods in this embodiment may be of any cross-sectional shape, including circular, elliptical, polygonal, rectangular, etc. Thus rods is not to be understood in a restrictive manner. Rods may thus be understood as any structure providing spaces, or holes through which parasite containing water can pass, but fish to be treated cannot. The hollow cylindrical filter member may be provided as one piece, or multiple pieces to be assembled. The filter member may comprise any suitable number of rods, to provide the filtering properties for the filter member. The rods may be interconnected to provide a mesh-like structure.

A second aspect of the present invention relates to a method for reducing the number of exterior parasites on fish, comprising the steps of a. Impinging the parasites on the fish with a fluid ejected uniformly from an annular nozzle slit against substantially the entire circumference of the fish, wherein the ejected fluid has a direction with an angle between perpendicular and parallel relative to the movement direction of the fish, and b. Filtering off the parasites detached from the fish.

In an embodiment of the second aspect of the present invention, the fluid used for impinging the fish, is ejected from a nozzle formed by a number of discrete nozzle members, the discrete nozzle members, each having a slit and being provided along the circumference of the inlet and/or outlet.

In an embodiment of the second aspect of the present invention the ejection fluid is air or water. Since air is not a native environment for the parasite the use of air as an ejection fluid contributes to the detachment of the parasite. Furthermore, by using air as the ejection fluid, the device may be produced in less noble materials, which do not have be able to withstand the corrosive nature of the saline water. By using water, the fish is kept moist for a longer duration of time, which may be preferable in some cases.

While the direction of the ejected fluid may have an angle between perpendicular and parallel relative to the movement direction of the fish, it is generally desired to have an angle between 10 degrees and 60 degrees, preferably between 20 and 45 degrees, to obtain a satisfactory reduction of the number of parasites without damaging the scales or skin of the fish.

In an embodiment of the second aspect of the present invention the fluid is ejected with a velocity of above 50 m/s, such as above, 70, or 100 m/s at the slit opening of the annular nozzle. The velocity of the fluid is typically subsonic, i.e. below 343 m/s, such as below, 300 m/s and preferably below 200 m/s.

Prior to step a. the fish is gently caught in the enclosure or tank in which it is farmed. Before the fish enters the device, the fish is generally separated from the water. The fish is generally removed from the aqueous environment via a pump of any sort and/or via a conveyor belt of any sort, which transports the fish to the device. Alternatively, the fish is led directly to the device. The separation may occur for example with a separation grating or just a grate. The fish may pass the device optionally aided by an operator or assisted by mechanical means. After fish has been treated with the ejected fluid and the parasites have been filtered off, the fish is reentered into the enclosure or tank. To avoid contamination of the treated fish it may be advantageous to quarantine the fish in an intermediate enclosure or tank. Alternatively, the tank or enclosure from which the fish originates is cleaned and disinfected before the fish is returned.

The exterior parasites attached to the fish may be of various types that have the common feature of being able to attaching and parasiting the fish. More than 500 species are recognised, divided into several genera. Fish lice vary in size from just a few millimeters to over 30 millimeters long, with females usually somewhat larger than the males. They have a flattened, oval body, which is almost entirely covered by a wide carapace. Their compound eyes are generally prominent, and the mouthparts and the first pair of antennae are modified to form a hooked, spiny proboscis armed with suckers, as an adaptation to parasitic life. They have four pairs of thoracic appendages, which are used to swim when not attached to the host.

The present device may be applied to any fish, especially farmed fish, including carps, tilapias, pangas, Roho labeo, salmon, croaker, salmonids, groupers, trouts, amberjack, seabreams, seabass, mullets, cyprinids, barramundis, and marble goby. The lice tend to be specific towards their host.

Atlantic salmons are farmed in the northern seas of Norway, Greenland, Iceland, Faroe Islands, Canada etc. Salmon lice include lice of the genera *Lepeophtheirus* and *Caligus*. The salmon lice *Lepeophtheirus salmonis*, is a species of copepod in the genus *Lepeophtheirus*. They are also known as "sea lice". They live off the mucus, skin and blood of the fish. They are natural marine parasites of fish, such as adult salmon. When they encounter a marine fish they adhere themselves to the skin, fins, the gills of the fish, and feeding off the mucous or skin. Sea lice only affect fish and are not harmful towards humans.

Sea lice are one of the major threats to salmon farmers. In small numbers, sea lice cause little damage to a fish although if populations increase on a fish, this can lead to death or inhibit the growth rate of the fish. The parasites can cause physical damage to the fish's fins, skin erosion, constant bleeding, and open wounds creating pathways for other pathogens. The sea lice may also act as a vector for diseases between wild and farmed salmon.

The interior diameter of the device inlet is generally adjusted to the circumference of the fish. Thus, a juvenile fish is generally treated with a device according to the present invention, which has a diameter of the inlet, which is less that the diameter of a device suitable for treating adult fish. Generally, the diameter is in the range of 5 cm (2") to 25 cm (10"). For atlantic salmons the diameter is suitably in the range of 10 cm (4") to 20 cm (8").

SHORT DESCRIPTION OF THE DRAWINGS

In the following, exemplary embodiments of a device according to the invention will be described with reference to the drawings in which:

FIG. 3A shows a filter member according to an embodiment of the invention

FIG. 3B shows a nozzle according to an embodiment of the invention

DETAILED DESCRIPTION OF THE DRAWINGS

Figure 1:
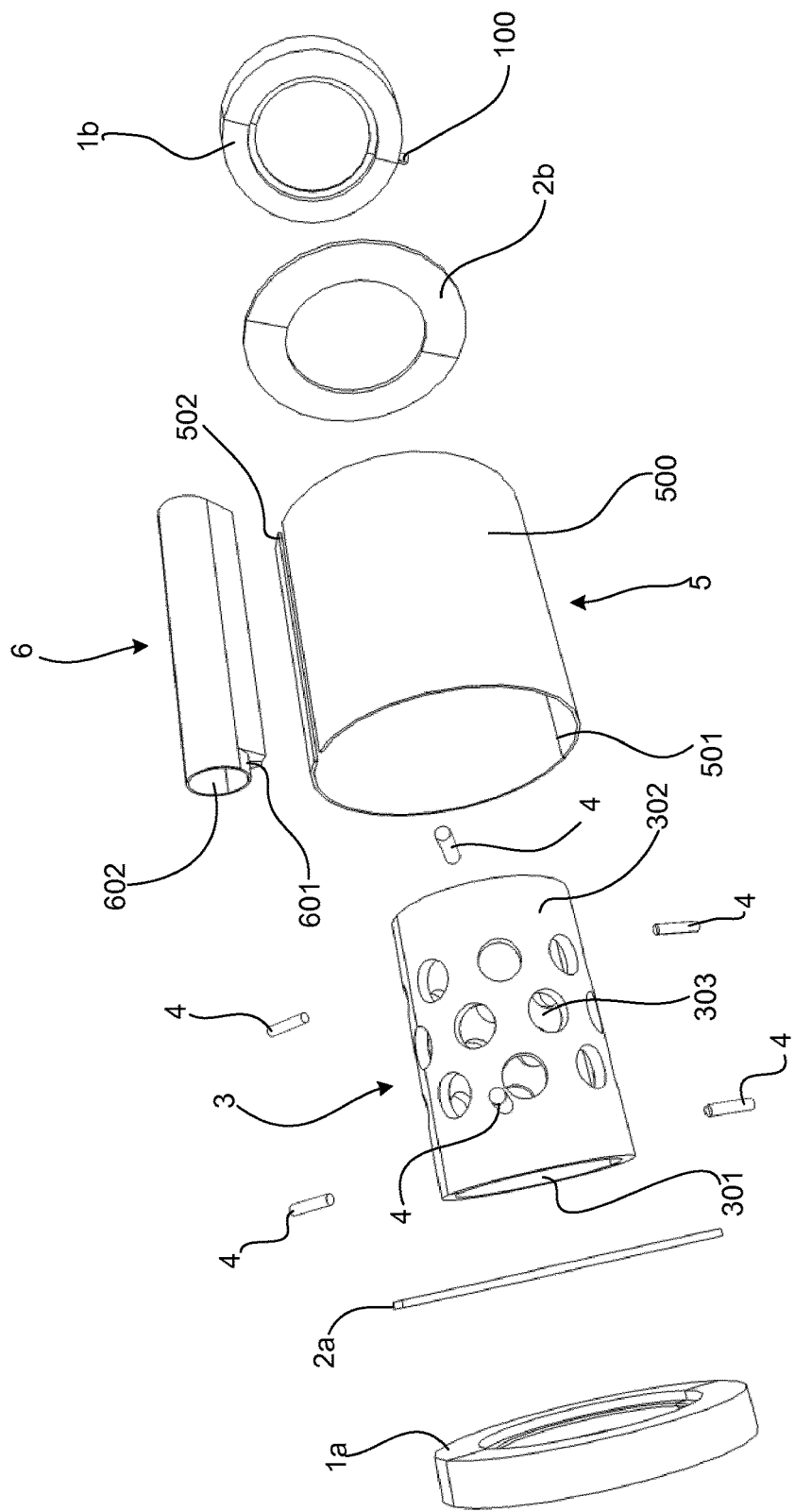
FIG. 1 shows an exploded perspective view of the device according to a first exemplary embodiment.
Figure 2:
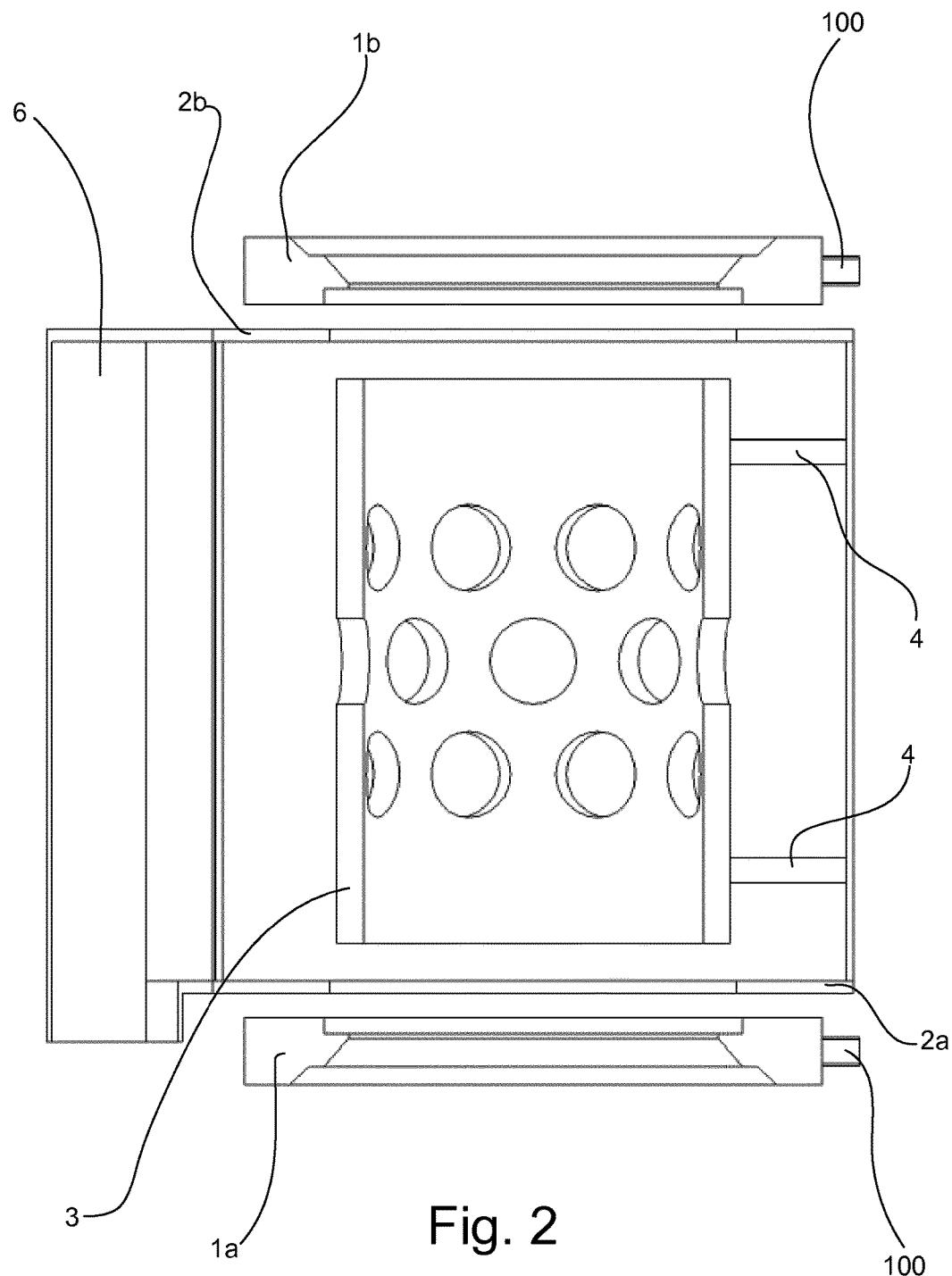
FIG. 2 shows a partly assembled device according to the first exemplary embodiment from a sectional view.

The device according to the exemplary embodiment consists of multiple individual parts shown in FIGS. 1 and 2. The device is comprised of two annular nozzles, 1a and 1b; two orifice plates, 2a and 2b; a filter member 3; six spacers 4, a housing 5, and a draining conduit 6.

The annular nozzles, 1a and 1b, are each provided with a fitting 100, adapted to be connected by suitable means to a fluid source. Each annular nozzle, 1a and 1b, is provided as two connected halves. Each orifice plate, 2a and 2b, is provided as two connected halves. The hollow cylindrical filter member 3, has an inlet, an outlet 301 and a body 302. The body 302 of the filter member obtains its filtering properties from perforation by a number of holes 303 provided in the body 302. The holes have a size that allows the parasites to pass while the fish is maintain the interior of the hollow cylindrical filter. The filter member 3 is constructed as two parts, each constituting half of the filter member 3. The housing 5 has a body 500 being a round hollow cylinder assembled from two halves, the two halves being connected along an edge 501 opposite an opening 502. The opening 502 is provided as a slit parallel to the axis of the housing between the two halves. The draining conduit 6 is comprised of a hollow cylinder, which is open at one end and closed in the other. The hollow cylinder has a longitudinal opening 601 adapted to fit the opening 502 of the housing. The open end of the draining conduit 6 provides an outlet 602 adapted to be connected with suitable draining means.

The filter member 3 is positioned within the housing 5, and held in place coaxially by the spacers 4. The spacers 4 are connected at one end to the outside of filter member 3 and at the other end to the inside of the housing 5, as seen on FIG. 2. At each end of the housing 5 an orifice ring, 2a or 2b, is connected forming a fluid tight connection between the housing 5 and the orifice rings, 2a and 2b. Around the opening 502, on the outside of the housing body 500 the draining conduit 6 is connected. The draining conduit is aligned so that the opening 601 and the opening 502 is in fluid connection with each other. The annular nozzle members are each connected to the side of the orifice ring, 2a and 2b facing away from the filter member 3.

When the ejected air from the nozzle 1b reaches the surface of the fish a first impact zone is formed around the circumference of the fish. Progressively as the fish moves through the nozzle 1b, the first impact zone between the surface of the fish and the ejected fluid moves along the entire length and circumference of the fish, ensuring a treatment of all parts of the exterior of the fish. The fish enters the device at the nozzle 1b, generally with the head first. As the nozzle ejects an air stream towards a predefined point in the interior of the hollow cylindrical filter 3 an angle will be formed between the surface of the fish and the direction of the ejected air.

Initially, the front end of the fish is impinged by an air current from the nozzle 1b. The air current forms a sharp angle with the surface of the front end of the fish. When the tail of the fish reaches the first zone of impact the angle will be less sharp due to the geometry of the fish. It is believed that some angles are more effective than others in scraping off the parasites from the skin of the fish. Therefore some parasites may remain on the surface of the fish after the first impact zone. When the fish reaches a second impact zone formed by the ejected air from nozzle 1a and the surface of the fish, parasites remaining on the surface of the fish will be treated with an air current having an angle, which is oriented in the opposite direction of the angle of the air current of the first impact zone. Thereby the entire surface of the fish is treated in two impact zones having different treatment angles.

The nozzles, 1a and 1b, may be of the commercially available type Ring Blade™ manufactured and sold by the company Nex Flow™. In a Ring Blade™, compressed air enters into an annular chamber and is throttled through a small ring nozzle at high velocity. This air stream clings to a "Coanda" profile directing the air stream towards the interior of the cylindrical filter. The air stream is angled to create a "cone style"-directed force to best clean and wipe the surface of the fish. Surrounding air is entrained, creating an amplified 360 degree conical airflow to uniformly wipe the surface of the fish passing through the Ring Blade™. The Ring Blade™ is commercially available in interior diameters ranging from 25.4 mm (1") to 153 mm (6").

The filter member according to an embodiment is shown in FIG. 3A. The filter member 3 is made up from two halves, each containing seven rods 10 interspaced between two half rods 11. Each of the rods is sloped at the ends with the slope facing inwards towards the center of the filter member. When the two halves of the filter member are positioned against each other, they form a filter member with sixteen rods, evenly spaced around the circumference of the filter member 3. Two connectors 12a, 12b are provided at each half of the filter member. Each connector is attached near one end of the seven rods 10, and the two half rods 11 of one half of the filter member 3, keeping the rods parallel, and at distance from each other. Each connector 12 is shaped as a small beam forming a half circle around the half circle of rods and half rods on one half of the filter member. When the two halves of the filter member are attached to each other, two complementary connectors form a full cylinder around all sixteen rods.

The nozzle 20 shown in FIG. 3B contains two inlets 15, a total of sixteen nozzle members 13, and a conduit body 14 connecting the inlets 15 to the nozzle members 13. Each nozzle member 13 has an outlet slit 16, though which a fluid can be ejected to provide a thin "ejector-blade" of fluid. Eight nozzle members are positioned in one level around the circumference of the conduit body 14 of the nozzle 20, and the slits 16 of these eight nozzles are arranged so that they provide a substantially annular slit around the circumference of the nozzle 20. This in principle provides an "ejector-blade" effect in a similar manner as the earlier described continuous annular nozzle. Eight nozzle members 13 are positioned in another level, around the circumference of the nozzle 20, and likewise arranged so that they provide a substantially annular slit around the circumference of the nozzle 20. The nozzle members 13 of the nozzle 20 are positioned equidistantly from each other within each level and the nozzle members 13 of one level is off-set in relation to the nozzle members 13 of the other level.

Figure 4:
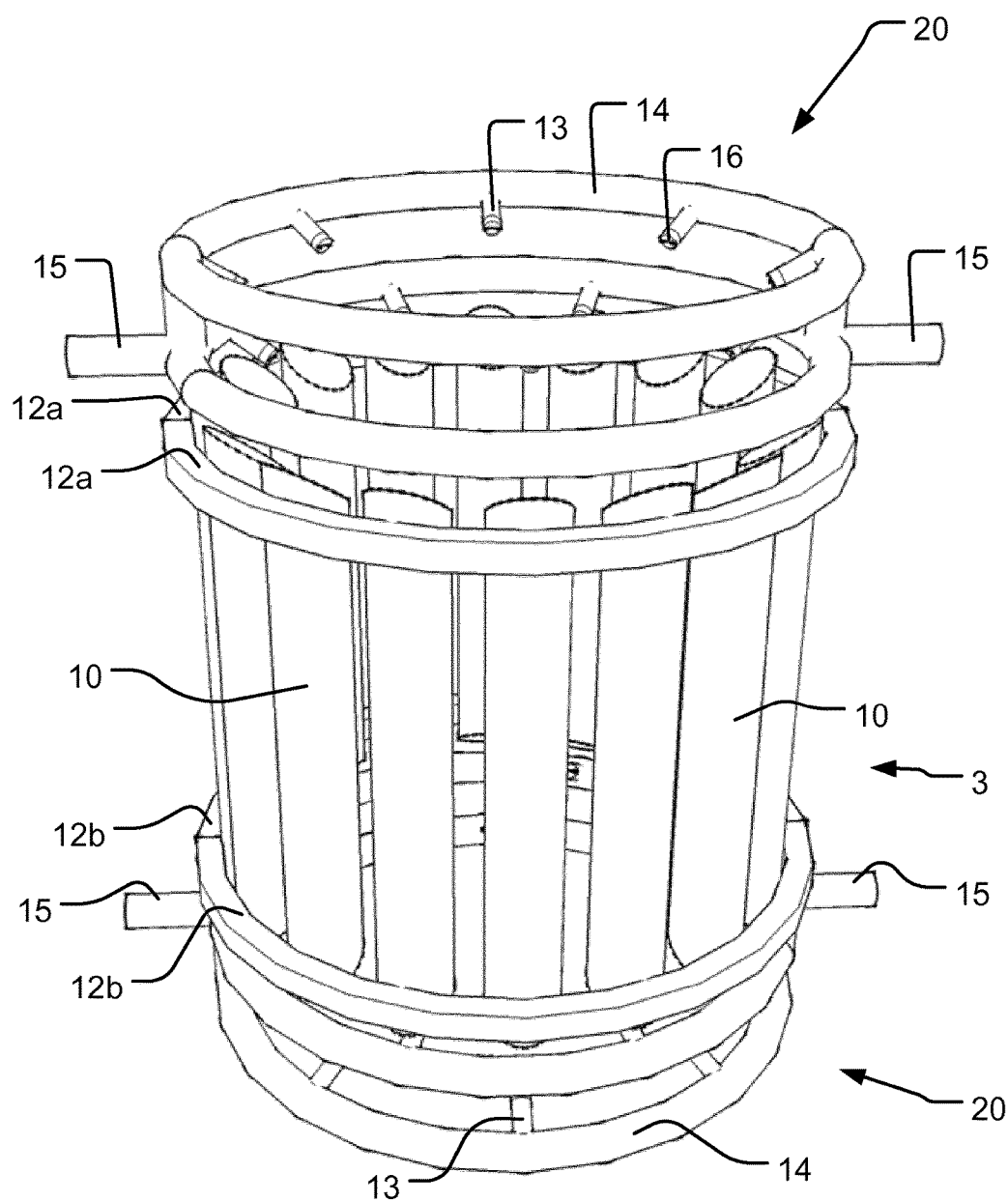
FIG. 4 shows an embodiment wherein the filtering device from the embodiment shown in FIG. 3A, and the nozzles from the embodiment shown in FIG. 3B is used, FIG. 4 also shows the relative positioning of the components.

FIG. 4 shows the filter member 3 according to the embodiment shown in FIG. 3A, and two nozzles 20 according to the embodiment shown in 3B in their relative position in an assembled state. One nozzle 20 is positioned at each end of the filter member 3.

The invention claimed is:

1. A device for reducing the number of exterior parasites on farmed fish, the device comprising:
   a hollow cylindrical filter member having a circumference and an interior, the hollow cylindrical filter member at an inlet end comprising an inlet with an inlet circumference and at an outlet end an outlet with an outlet circumference, the hollow cylindrical filter member being provided with holes between the inlet end and the outlet end, the holes allow exterior parasites to pass through the holes of the hollow cylindrical filter member while maintaining fish in the interior;
   a first nozzle provided at the inlet end and having a substantially annular slit along the inlet circumference or a first nozzle provided at the outlet end and having a substantially annular slit along the outlet circumference for ejecting a fluid towards a first predefined point in the interior of the hollow cylindrical filter member between the inlet end and the outlet end.

2. The device according to claim 1, wherein the substantially annular slit is formed by 4 or more discrete nozzle members, each having a slit, wherein the discrete nozzle members are provided along the inlet circumference and/or the outlet circumference.

3. The device according to claim 2, wherein the first nozzle comprises two or more nozzle elements arranged in two or more levels displaced along a longitudinal axis of the hollow cylindrical filter member.

4. The device according to claim 3, wherein the discrete nozzle members of one of the nozzle elements at one level are off-set relative to the discrete nozzle members of another of the nozzle elements at another level.

5. The device according to claim 1, wherein the substantially annular slit is continuous.

6. The device according to claim 5, wherein the first nozzle comprises two or more nozzle elements arranged in two or more levels displaced along the axis of the hollow cylindrical filter member.

7. The device according to claim 6, wherein the discrete nozzle members of a nozzle element of at one level are off-set relative to the discrete nozzle members of a nozzle element at another level.

8. The device according to claim 1, further comprising a housing encasing the hollow cylindrical filter member and connected to the inlet and the outlet, providing a substantially fluid tight connection.

9. The device according to claim 8, further comprising a draining conduit provided in the housing, said draining conduit having at least one opening arranged to receive the parasites.

10. The device according to claim 1, wherein the first nozzle defines an angle of ejection in the range of 10 degrees and 60 degrees relative to a longitudinal axis of the hollow cylindrical filter member.

11. The device according to claim 1, further comprising a second nozzle having a substantially annular slit along the inlet circumference or along the outlet circumference not occupied by the first nozzle, wherein the substantially annular slit of the second nozzle is provided for ejecting a fluid towards a second predefined point of the hollow cylindrical filter member.

12. The device according to claim 11, wherein the second nozzle comprises a number of discrete nozzle members forming the substantially annular slit, each nozzle member having a slit, wherein the discrete nozzle members are provided along the inlet circumference or along the outlet circumference not occupied by the first nozzle.

13. The device according to claim 12, wherein the first nozzle comprises two or more nozzle elements arranged in two or more levels displaced along a longitudinal axis of the hollow cylindrical filter member.

14. The device according to claim 13, wherein a discrete nozzle member of one of the nozzle elements at one level is off-set relative to a discrete nozzle member of another of the nozzle elements at another level.

15. The device according to claim 11, wherein the first and the second predefined points are provided at different locations in the hollow cylindrical filter member.

16. The device according to claim 1, wherein said substantially annular slit has a width between 0.01 mm and 2 mm.

17. The device according to claim 1, wherein the fluid is air or water or air and water.

18. A device for reducing the number of exterior parasites on farmed fish, the device comprising:
   a hollow cylindrical filter member having a circumference and an interior, the hollow cylindrical filter member at an inlet end comprising an inlet with an inlet circumference and at an outlet end an outlet with an outlet circumference, the hollow cylindrical filter member being provided with holes between the inlet end and the outlet end, the holes allow exterior parasites to pass through the holes of the hollow cylindrical filter member while maintaining fish in the interior, the inlet circumference or the outlet circumference being provided with a first nozzle;
   wherein the first nozzle has a substantially annular slit along the inlet circumference and/or along the outlet circumference for ejecting a fluid towards a first predefined point in the interior of the hollow cylindrical filter member between the inlet end and the outlet end;
   wherein the hollow cylindrical filter member comprises a number of rods around the circumference of the hollow cylindrical filter member, the rods are arranged so as to be parallel to and spaced apart from each other so that spaces exist between the rods, the spaces providing the holes of the hollow cylindrical filter member.

* * * * *